US008913294B2

(12) United States Patent
Tomaru

(10) Patent No.: US 8,913,294 B2
(45) Date of Patent: Dec. 16, 2014

(54) IMAGE PROCESSING APPARATUS AND IMAGE PROCESSING SYSTEM

(75) Inventor: Masashi Tomaru, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1034 days.

(21) Appl. No.: 11/896,831

(22) Filed: Sep. 6, 2007

(65) Prior Publication Data

US 2008/0074688 A1    Mar. 27, 2008

(30) Foreign Application Priority Data

Sep. 21, 2006   (JP) .................................. 2006-255998

(51) Int. Cl.
*H04N 1/60*    (2006.01)
*H04N 1/32*    (2006.01)

(52) U.S. Cl.
CPC .......... *H04N 1/6072* (2013.01); *H04N 1/32128* (2013.01); *H04N 2201/0082* (2013.01); *H04N 2201/326* (2013.01); *H04N 2201/3259* (2013.01)
USPC .......................................................... 358/2.1

(58) Field of Classification Search
CPC ....................................................... H04N 1/60
See application file for complete search history.

(56) References Cited

U.S. PATENT DOCUMENTS

| 6,781,823 | B1 * | 8/2004 | Nyack ...................... 361/679.29 |
| 7,697,164 | B2 * | 4/2010 | Matama ......................... 358/1.9 |
| 2002/0001101 | A1 * | 1/2002 | Hamura et al. .............. 358/1.17 |
| 2003/0001856 | A1 * | 1/2003 | Sawada et al. ................ 345/581 |
| 2003/0026619 | A1 * | 2/2003 | Miyoshi et al. .................. 399/19 |
| 2003/0118234 | A1 * | 6/2003 | Tanaka et al. ................. 382/173 |
| 2004/0080515 | A1 * | 4/2004 | Hagiwara ..................... 345/581 |
| 2004/0156544 | A1 * | 8/2004 | Kajihara ....................... 382/167 |
| 2004/0212834 | A1 * | 10/2004 | Edwards et al. ............. 358/1.18 |
| 2005/0182508 | A1 * | 8/2005 | Niimi et al. ................... 700/138 |
| 2005/0200909 | A1 * | 9/2005 | Kim ............................. 358/448 |
| 2007/0019259 | A1 * | 1/2007 | Lee .............................. 358/527 |
| 2007/0133031 | A1 * | 6/2007 | Takaragi et al. ............. 358/1.13 |
| 2007/0242282 | A1 * | 10/2007 | Hashimoto .................... 358/1.2 |

FOREIGN PATENT DOCUMENTS

JP   11027553 A  *  1/1999
JP   2003-103884     4/2003

* cited by examiner

*Primary Examiner* — Marivelisse Santiago Cordero
*Assistant Examiner* — Mesfin Getaneh
(74) *Attorney, Agent, or Firm* — Kubotera & Associates, LLC

(57) ABSTRACT

An image processing apparatus receives print data including text attribute information, and performs specific image processing defined in the print data in advance. The image processing apparatus includes a specific level detection unit for detecting a specific level defined in advance from the text attribute information; and an image processing unit for performing image processing defined in advance on the print data in the specific level detected by the specific level detection unit.

10 Claims, 18 Drawing Sheets

Text modification processed

<front page>~</front page>
/First paragraph/

Page 1

<chapter 1>~</chapter 1>
/Second paragraph/

Chapter 1
Product Description

Chapter 1.1 Product's Main Features

Chapter 1.2 Specifications

Chapter 1.3 Options

Chapter 1.4 Dimensions

Page 2

<chapter 2>~</chapter 2>
/Third paragraph/

Chapter 2 About Support

Page 3

```
                                                          200
                                                    ┌─────────┐
                                                    │Print data│
       <?xml version="1.0" encoding="Shift_JIS"?>
201    < bookbinding data>
210    ┌─────────────────────────────────────────────────────┐
       │<front page>                                         │
211    │        <title>Product Guide</title>                 │
       │        <picture>Jacket image</picture>              │
       │</front page>                                        │
       └─────────────────────────────────────────────────────┘
       ┌─────────────────────────────────────────────────────┐
       │<chapter 1>                                          │
       │                                                     │
212    │<title>Chapter 1 Product Description</title>         │
       │<picture>Product image</picture>                     │
       │<chapter 1.1>                                        │
       │    <explanation>Chapter 1.1 Product's Main          │
       │Features</explanation>                               │
       │</chapter 1.1>                                       │
       │<chapter 1.2>                                        │
       │    <explanation>Chapter 1.2 Specifications</explanation>
       │</chapter 1.2>                                       │
       │<chapter 1.3>                                        │
       │    <explanation>Chapter 1.3 Options</explanation>   │
       │</chapter 1.3>                                       │
       │<chapter 1.4>                                        │
       │    <explanation>Chapter 1.4 Dimensions</explanation>│
       │</chapter 1.4>                                       │
       │</chapter 1>                                         │
       └─────────────────────────────────────────────────────┘
       ┌─────────────────────────────────────────────────────┐
       │<chapter 2>                                          │
213    │        <title>Chapter 2 About Support</title>       │
       │</chapter 2>                                         │
       └─────────────────────────────────────────────────────┘
       < /bookbinding data>
```

FIG. 2

| | Root level attribute | \<bookbinding data\>~ \</bookbinding data\> | 225 |
|---|---|---|---|
| 221 | First level attribute | \<front page\>~\</front page\> //First paragraph// | |
| | | \<chapter 1\>~\</chapter 1\> //Second paragraph// | 226 |
| 222 | | \<chapter 2\>~\</chapter 2\> //Third paragraph// | 227 |
| | Second level attribute | \<title\>~\</title\> | |
| 220 Text attribute information | | \<picture\>~\</picture\> | |
| | | \<chapter 1.1\>~\</chapter 1.1\> | |
| | | \<chapter 1.2\>~\</chapter 1.2\> | |
| 223 | | \<chapter 1.3\>~\</chapter 1.3\> | |
| | | \<chapter 1.4\>~\</chapter 1.4\> | |
| 224 | Third level attribute | \<explanation\>~\</explanation\> | |

FIG. 3

| 171 | 310 | | |
|---|---|---|---|
| Setting information | First paragraph setting //Front page// | Color correction setting | Vivid color |
| | | Black generation setting | Mixed color CMYK |
| | Text paragraph setting //Chapter 1// //Chapter 2// | Color correction setting | Natural color |
| | | Black generation setting | Single color K |

| Color correction table : Vivid color table |||||||
|---|---|---|---|---|---|---|
| Input values 0~255 ||| Output values 0~255 ||||
| R | G | B | C | M | Y | K |
| 0 | 0 | 0 | 255 | 255 | 255 | 85 |
| 0 | 0 | 1 | 255 | 254 | 253 | 84 |
| ⋮ ||||||||
| 254 | 255 | 255 | 3 | 0 | 0 | 1 |
| 255 | 255 | 255 | 0 | 0 | 0 | 0 |

| Black generation table : Mixed Color CMYK table ||||||||
|---|---|---|---|---|---|---|---|
| Input values 0~255 |||| Output values 0~255 ||||
| C | M | Y | K | C | M | Y | K |
| 255 | 255 | 255 | 255 | 128 | 128 | 128 | 200 |
| 255 | 255 | 255 | 254 | 128 | 128 | 128 | 189 |
| ⋮ ||||||||
| 1 | 0 | 0 | 0 | 1 | 1 | 0 | 2 |
| 0 | 0 | 0 | 0 | 0 | 0 | 0 | 0 |

IMAGE PROCESSING APPARATUS AND IMAGE PROCESSING SYSTEM

BACKGROUND OF THE INVENTION

The present invention relates to an image processing apparatus and am image processing system. In particular, the present invention relates to an image processing apparatus and am image processing system capable of performing a color correction process.

A conventional image forming apparatus such as a printer receives print data per job from a host device. Then, the conventional image forming apparatus performs a specific color correction process on the print data (job data) thus received, thereby correcting a density variance due to a change in environment or a difference in devices. In this case, the conventional image forming apparatus performs a specific color correction process uniformly on all of the job data thus received.

Patent Reference Japanese Patent Publication No. 2003-103884

As described above, the conventional image processing apparatus performs the image processing uniformly on all of the job data including a text string of large font representing a title; a front page having a graphic picture; or contents including texts and graphics for explanation or analysis. Accordingly, it is difficult to perform image processing specific to a front page.

In view of the problems described above, an object of the present invention is to provide an image processing apparatus capable of solving the problems of the conventional image processing apparatus.

Further objects and advantages of the invention will be apparent from the following description of the invention.

SUMMARY OF THE INVENTION

In order to attain the objects described above, according to the present invention, an image processing apparatus receives print data including text attribute information, and performs specific image processing defined in the print data in advance.

According to the present invention, the image processing apparatus comprises a specific level detection unit for detecting a specific level defined in advance from the text attribute information; and an image processing unit for performing image processing defined in advance on the print data in the specific level detected by the specific level detection unit.

In the present invention, as described above, the image processing apparatus comprises the specific level detection unit for detecting the specific level defined in advance from the text attribute information; and the image processing unit for performing the image processing defined in advance on the print data in the specific level detected by the specific level detection unit.

Accordingly, it is possible to perform the image processing only on print data at a specific location. Therefore, it is possible to perform specific image processing (for example, increasing brightness) defined in advance only on an image at a specific location (for example, a front page).

BRIEF DESCRIPTION OF THE DRAWINGS

FIG. 2 is a schematic view showing an example of an XML document according to the first embodiment of the present invention;

FIG. 3 is a schematic view showing text attribute information according to the first embodiment of the present invention;

FIG. 4 is a schematic view showing setting information according to the first embodiment of the present invention;

DETAILED DESCRIPTION OF THE PREFERRED EMBODIMENTS

Hereunder, embodiments of the present invention will be explained with reference to the accompanying drawings.

First Embodiment

Figure 1:
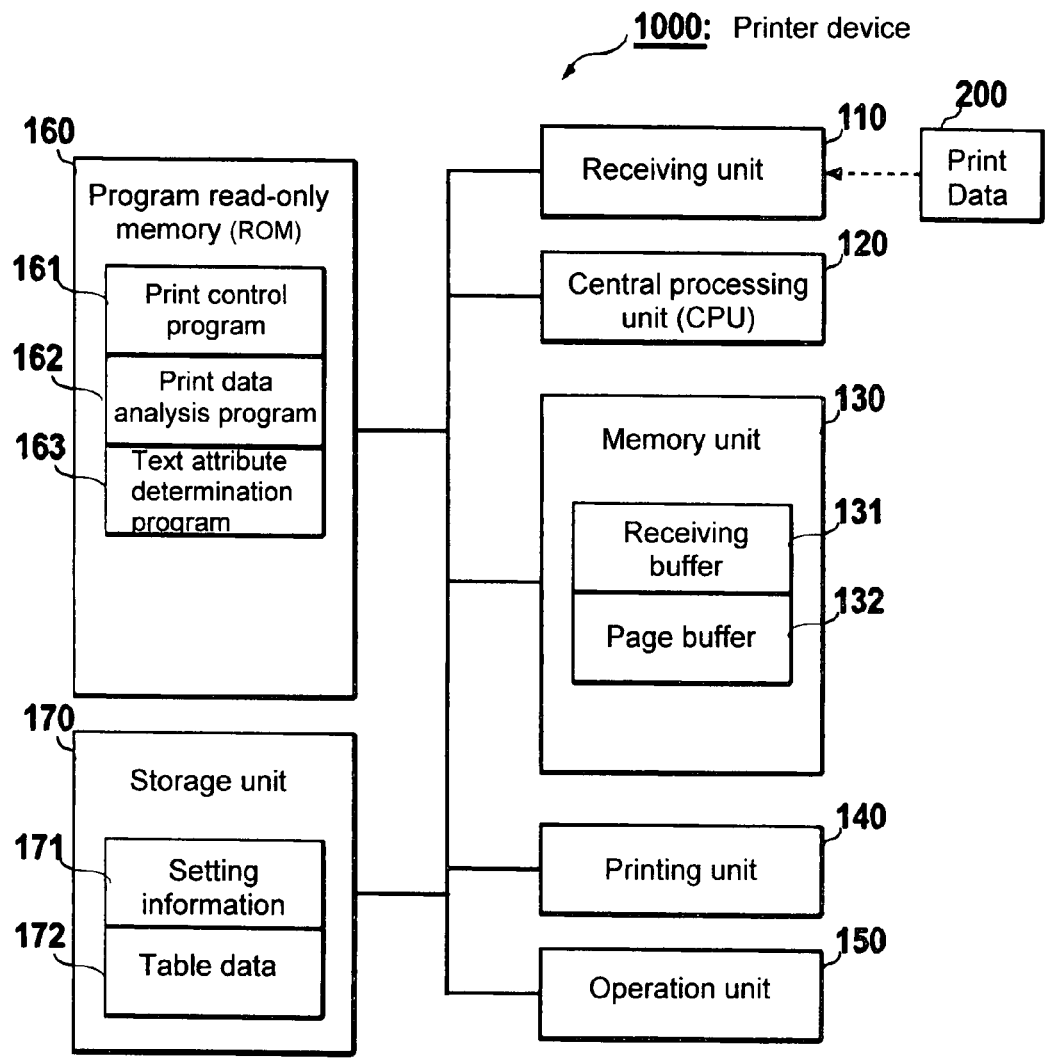
FIG. 1 is a block diagram showing a configuration of a printer device according to a first embodiment of the present invention.

A first embodiment of the present invention will be explained. FIG. 1 is a block diagram showing a configuration of a printer device 1000 according to the first embodiment of the present invention.

As shown in FIG. 1, the printer device 1000 includes a receiving unit 110; a central processing unit (CPU) 120; a memory unit 130; a printing unit 140; an operation unit 150; a program read-only memory (ROM) 160; and a storage unit 170.

In the embodiment, the receiving unit 110 is provided for receiving print data 200 from a host device (not shown). The CPU 120 includes a microprocessor for executing a print control program 161 stored in the program ROM 160.

In the embodiment, the memory unit 130 includes a receiving buffer 131 for storing the print data 200 thus received and a page buffer 132 for storing bit map data obtained after the print data 200 is analyzed. The printing unit 140 includes a print engine for receiving the bit map data from the page buffer 132 and printing the bit map data. The operation unit 150 includes a data input-output device having a display for displaying display information and a keyboard for inputting setting information.

In the embodiment, the program ROM 160 stores in advance a print data control program 161 for controlling the printing unit 140 to create an image; a print data analysis program 162 for analyzing the print data and converting the print data to the bit map data; and a text attribute determination program 163 for determining a text attribute from text attribute information of the print data. The storage unit 170 includes a non-volatile memory for storing setting information 171 including an image processing setting and table data 172 including a table for image processing.

Contents of information used in the first embodiment will be explained next. FIG. 2 is a schematic view showing an example of an XML document (print data) according to the first embodiment of the present invention.

As shown in FIG. 2, the XML document includes a plurality of tags indicating data partitions. In principle, a declaration tag 201 indicating an XML version is arranged at a top position. Subsequent data are sandwiched with pairs of tags. In one pair of tags, the first one is referred to as a front tag and designated with <xxx>, and the second one is referred to as an end tag and designated with </xxx>. In this case, xxx represents an arbitrary text string.

In the XML document, a plurality of pairs of the tags is arranged and overlapped to form a hierarchy structure. In the hierarchy structure, a pair of tags at a first level is arranged at a left end position, and pairs of tags at subsequent levels are arranged at positions sequentially shifted from the left end position toward a right side. In each level, <xxx> represents the front tag and </xxx> represents the end tag.

In the XML document, only one declaration tag 201 is arranged. In the specification, the text attributes of the XML document are defined as a root level attribute 221, a first level attribute 222, a second level attribute 223, and a third level attribute 224 according to the positions of the declaration tag 201 and the other tags.

A relationship between the print data 200 and the text attribute information representing the text attributes will be explained next. FIG. 3 is a schematic view showing the text attribute information according to the first embodiment of the present invention.

As shown in FIG. 3, the text attribute information includes the tags in the print data shown in FIG. 2, and the tags are shown according to the attributes in each level. In FIG. 3, the root level attribute 221, the first level attribute 222, the second level attribute 223, the third level attribute 224 are collectively referred to as text attribute information 220.

In the embodiment, the root level attribute 221 includes <bookbinding data> and </bookbinding data>, and the first level attribute 222 includes <front page>, </front page>, <chapter 1>, </chapter 1>, <chapter 2>, and </chapter 2>. Further, the second level attribute 223 includes <title>, </title>, <picture>, </picture>, <chapter 1.1>, </chapter 1.1>, <chapter 1.2>, </chapter 1.2>, <chapter 1.3>, </chapter 1.3>, <chapter 1.4>, and </chapter 1.4>. The third level attribute 224 includes <explanation> and </explanation>.

In the first level attribute 222, a first tag from the root level attribute 221 is designated with a first paragraph 225; a second tag from the root level attribute 221 is designated with a second paragraph 226; and a third tag from the root level attribute 221 is designated with a third paragraph 227. In the embodiment, when the CPU 120 (FIG. 1) executes the print data analysis program 162 (FIG. 1) and recognizes the declaration tag 201, the CPU 120 switches to a bookbinding print mode.

FIG. 4 is a schematic view showing the setting information according to the first embodiment of the present invention. The setting information shown in FIG. 4 is used for performing image processing on the paragraphs constituting the first level attribute 222 (FIG. 3), and is stored in the storage unit 170 (FIG. 1) as the setting information 171 (FIG. 1). In the embodiment, the setting information 171 is related to color as an example, and is registered in advance through utility and the likes.

As shown in FIG. 4, the setting information 171 includes a first paragraph setting 310 and a text paragraph setting 320. In the first paragraph setting 310, "vivid color" is assigned as a color correction setting, and "mixed color CMYK" is assigned in a black generation setting. In the text paragraph setting 320, "natural color" is assigned as the color correction setting, and "single color K" is assigned as the black generation setting.

In the embodiment, it is assumed that the first paragraph 225 (FIG. 3) becomes a front page, so that the image processing generates a vivid and deep image on the front page using the first paragraph setting 310. Similarly, it is assumed that first and subsequent paragraphs become normal pages, so that the image processing generates a natural and black image on the normal pages using the text paragraph setting 320.

Figure 5:
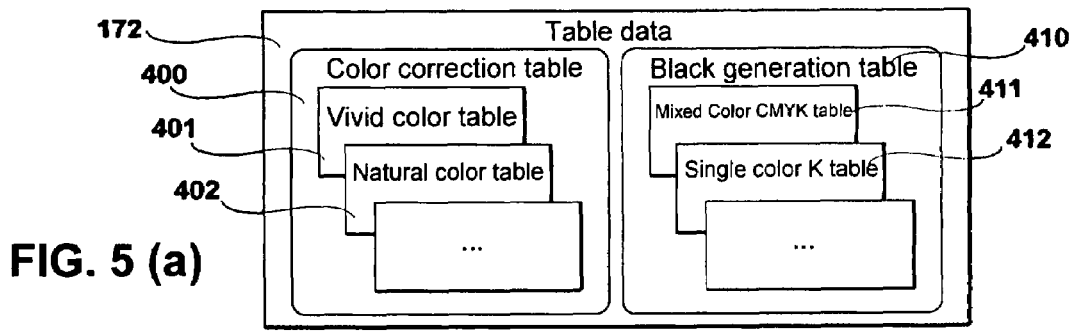
FIGS. 5(*a*) to 5(*c*) are schematic views showing table data for image processing according to the first embodiment of the present invention.

FIGS. 5(a) to 5(c) are schematic views showing table data for the image processing according to the first embodiment of the present invention. As shown in FIG. 5(a) the table data 172 (FIG. 1) stored in the storage unit 170 are formed of color processing table data 400 and black generation table data 410. The color processing table data 400 include vivid color table data 401 and natural color table data 402, and the black generation table data 410 include CMYK mixed color table data 411 and K single color table data 412.

FIG. 5(b) is a schematic view showing an example of the vivid color table data 401. As shown in FIG. 5(b), the vivid color table data 401 include input values from 0 to 255 and output values from 0 to 255. When a mixture ratio of input values RGB (red, green, blue) is determined in the vivid color table data 401 shown in FIG. 5(b), a mixture ratio of output values CMYK (cyan, magenta, yellow, black) is determined. The output values CMYK are expressed in numbers for generating a vivid color.

FIG. 5(c) is a schematic view showing an example of the black generation table data 410. As shown in FIG. 5(c), the black generation table data 410 include input values from 0 to 255 and output values from 0 to 255. When a mixture ratio of input values CMYK (cyan, magenta, yellow, black) is determined in the black generation table data 410 shown in FIG. 5(c), a mixture ratio of output values CMYK (cyan, magenta, yellow, black) is determined. The output values CMYK are expressed in numbers in consideration of a composition ratio of black.

Figure 6:
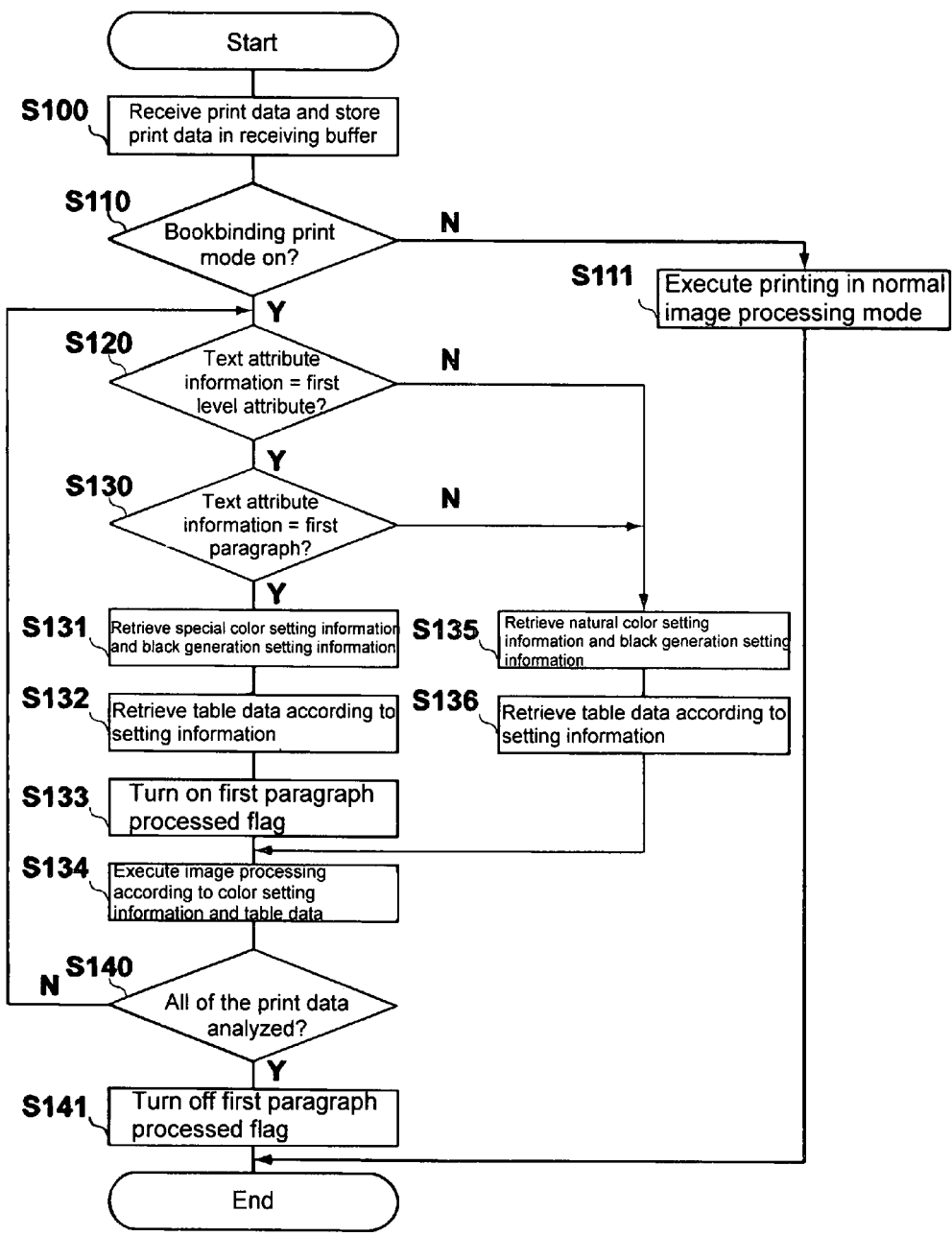
FIG. 6 is a flow chart showing an operation of the printer device according to the first embodiment of the present invention.

An operation of the printer device 1000 will be explained next. FIG. 6 is a flow chart showing the operation of the printer device 1000 according to the first embodiment of the present invention.

In step S100, the receiving unit 110 receives the print data and stores the print data in the receiving buffer 131. In step S110, the CPU 120 executes the print data analysis program 162, and reads the print data from the receiving buffer 131 to analyze the print data. When the CPU 120 confirms the declaration tag 201, the process proceeds to step S135. When the CPU 120 does not confirm the declaration tag 201, the process proceeds to step S111.

In step S111, the CPU 120 determines a normal image processing mode (without the declaration tag 201), and executes the print control program 161. Accordingly, the CPU 120 converts the print data to the bit map data through a normal image processing, and stores the bit map data in the page buffer 132, thereby completing the process.

In step S120, the CPU 120 determines the bookbinding print mode, and executes the text attribute determination program 163. Then, the CPU 120 reads the print data from the receiving buffer 131. After the CPU 120 recognizes "<bookbinding data> element </bookbinding data>" indicating the root level attribute 221 in the print data, the CPU 120 recognizes <xxx> and </xxx> as the text attribute information. Then, the CPU 120 determines whether the text attribute of "<xxx> element </xxx>" is one of the first level attribute 222, the second level attribute 223, and the third level attribute 224 according to a position of <xxx> and </xxx>. When the CPU 120 determines that the text attribute of "<xxx> element </xxx>" is the first level attribute 222, the process proceeds to step S130. Otherwise, the process proceeds to step S135.

In step S130, the CPU 120 executes the text attribute determination program 163. When the CPU 120 determines that the text attribute of the print data is the first level attribute 222, the CPU 120 further determines whether the first paragraph 225 exists in the print data. When it is determined that the first paragraph 225 exists in the print data, the process proceeds to step S131. When it is determined that the first paragraph 225 does not exist in the print data, the process proceeds to step S135.

In step S131, when the CPU 120 recognizes the first paragraph 225 in the print data, the CPU 120 executes the print data analysis program 162. Accordingly, the CPU 120 performs the color processing setting of the first paragraph setting 310 of the storage unit 170, and obtains the color processing table data 400 and the black generation table data 410 corresponding to the black generation setting.

In step S132, the CPU 120 retrieves the vivid color table data 401 and the CMYK mixed color table data 411 from the table data 172. In step S133, the CPU 120 turns on a first paragraph processed flag, and the process proceeds to step S134.

In step S134, the CPU 120 executes the print data analysis program 162, and converts the print data to the bit map data through specific color correction processing according to the color setting information and the table data. Then, the CPU 120 stores the bit map data in the page buffer 132.

In step S135, the CPU 120 executes the print data analysis program 162, and retrieves natural color setting information from the setting information 171 for performing natural color correction processing.

In step S136, the CPU 120 retrieves the natural color table data 402 and the K single color table data 412 from the table data 172, then the process proceeds to step S134. In this case, in step S134, the CPU 120 converts the print data to the bit map data according to the natural color table data 402 and the K single color table data 412, and outputs the bit map data to the page buffer 132.

In step S140, the CPU 120 determines whether all of the print data is analyzed. When all of the print data is analyzed, the process proceeds to step S141. When all of the print data is not analyzed, the process returns to step S120, thereby repeating the process until all of the print data is analyzed.

In step S142, the CPU 120 turns off the first paragraph processed flag, thereby completing the process. The CPU 120 waits for next print data.

Figure 7:
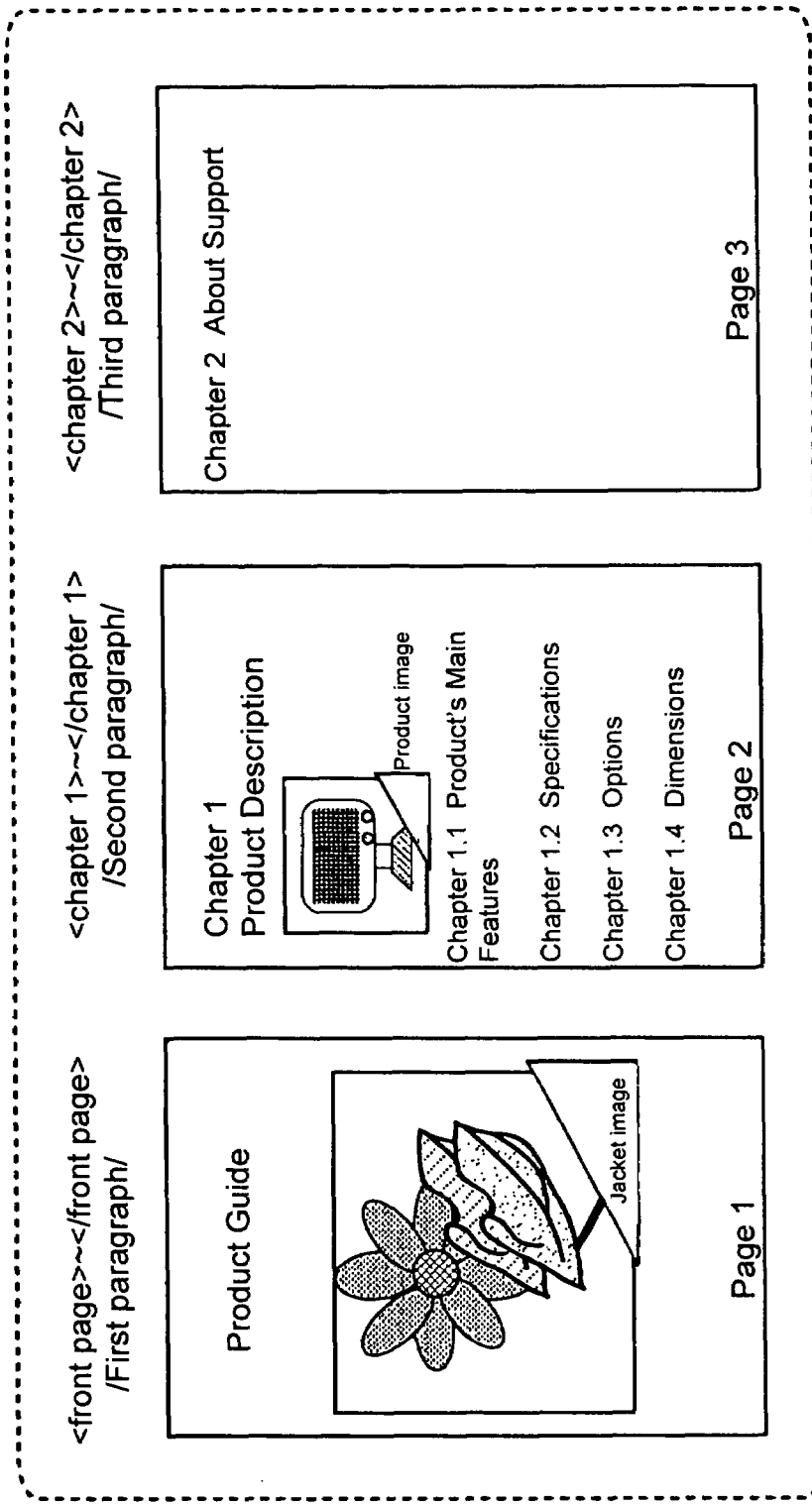
FIG. 7 is a view showing an example No. 1 of an output image of a conventional image processing apparatus.

FIG. 7 is a view showing an example No. 1 of an output image of a conventional image processing apparatus. In the output image shown in FIG. 7, a front page is printed without image processing, and the first paragraph 225, the second paragraph 226, and the third paragraph 227 are printed on first to third pages, respectively.

Figure 8:
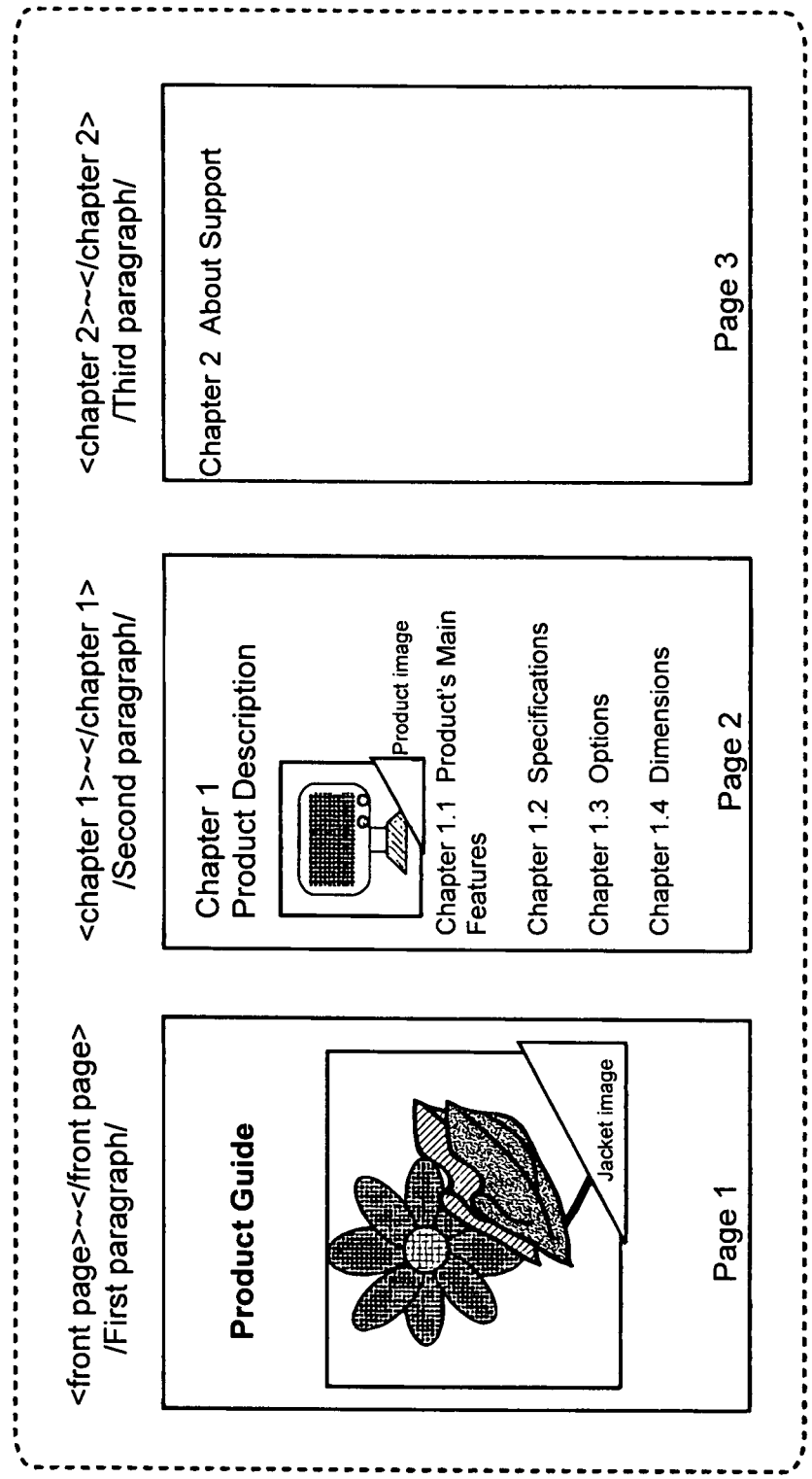
FIG. 8 is a view showing an example of an output image of the image processing apparatus according to the first embodiment of the present invention.

FIG. 8 is a view showing an example of an output image of the image processing apparatus 1000 according to the first embodiment of the present invention. In the output image shown in FIG. 8, the front page is printed with the image processing, and the first paragraph 225, the second paragraph 226, and the third paragraph 227 are printed on first to third pages, respectively.

As compared with the output image without the image processing shown in FIG. 7, in the output image shown in FIG. 8 with the image processing, only the first paragraph 225 is printed vividly, and the text thereof becomes deep.

As described above, in the embodiment, the level information is obtained from the text attribute information of the print data. When the print data is determined to be the first paragraph with the first level attribute, the color correction processing and the black generation for the first paragraph are performed. When the print data is determined to be the second paragraph or subsequent paragraphs, the color correction processing and the black generation for the second paragraph or subsequent paragraphs are performed. Accordingly, it is possible to perform the specific image processing only on the front page on which the first paragraph is printed, thereby obtaining a document impressive to a reader.

In the embodiment, the printer device 1000 performs the color correction processing and the black generation as the image processing, and may perform other processing such as base color removal processing, gradation correction processing, and screening processing.

Second Embodiment

A second embodiment of the present invention will be explained next. In the first embodiment, the level information is obtained from the text attribute information 220 of the print data 200, so that the specific image processing is performed on the print data of the first paragraph 225 with the first level attribute 222. In the second embodiment, specific image processing is performed on the print data 200 having a tag text string matching to a user specified text string 900.

Figure 9:
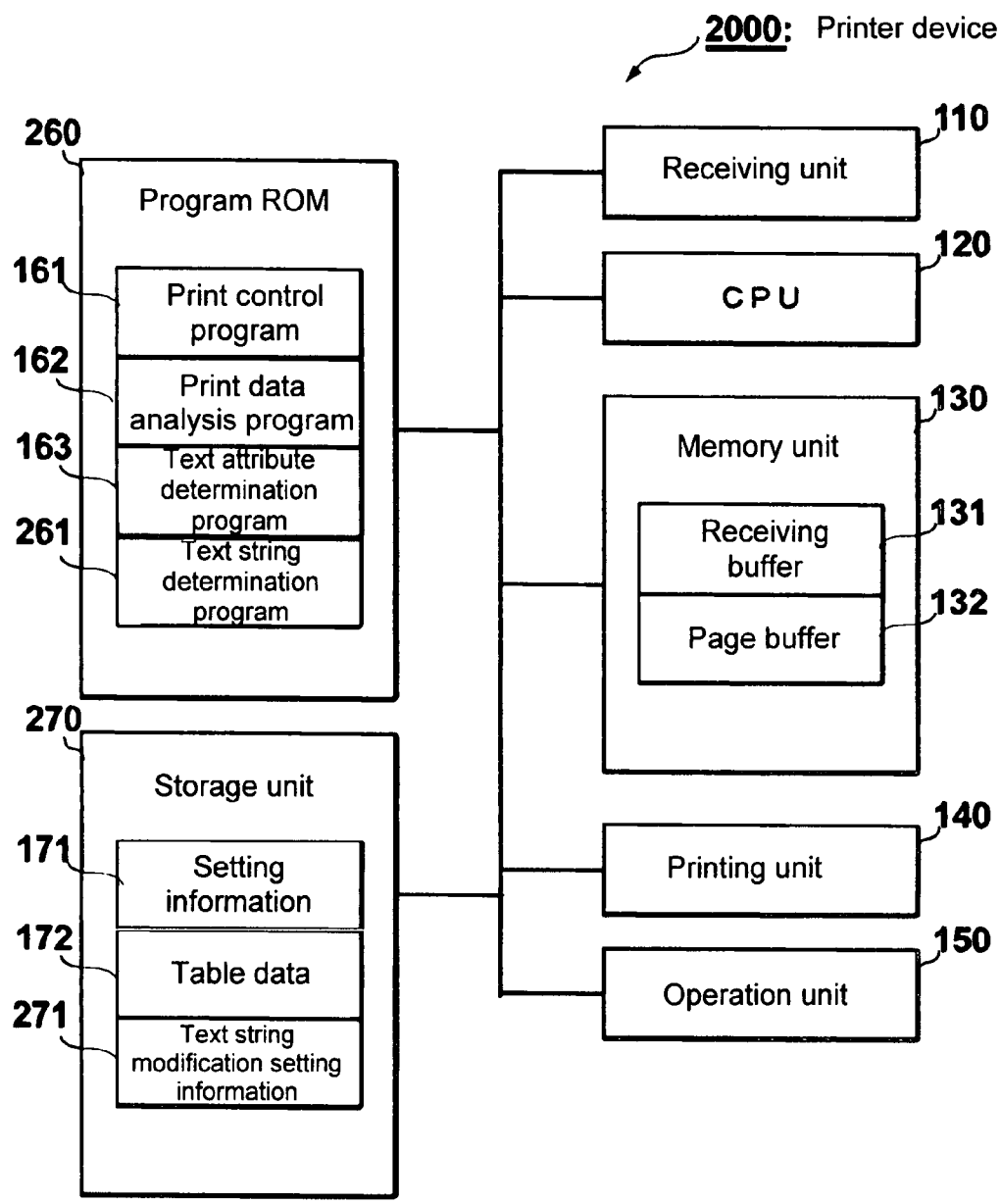
FIG. 9 is a block diagram showing a configuration of a printer device according to a second embodiment of the present invention.

FIG. 9 is a block diagram showing a configuration of a printer device 2000 according to a second embodiment of the present invention. Components in the second embodiment similar to those in the first embodiment are designated with the same reference numerals, and explanations thereof are omitted. In the following description, only differences from the first embodiment will be explained.

As shown in FIG. 9, the printer device 2000 includes the receiving unit 110; the central processing unit (CPU) 120; the memory unit 130; the printing unit 140; the operation unit 150; a program read-only memory (ROM) 260; and a storage unit 270.

In the embodiment, the program ROM 260 stores in advance the print data control program 161 for controlling the printing unit 140 to create an image; the print data analysis program 162 for analyzing the print data and converting the print data to the bit map data; the text attribute determination program 163 for determining text attribute from the text attribute information of the print data; and a text string determination program 261 for determining whether a tag text string of the print data 200 matches to a user specified text string.

In the embodiment, the storage unit 270 includes a non-volatile memory for storing setting information 171 including the image processing setting, table data 172 including the table for the image processing, and text string modification setting information 271 for the tag text string and the user specified text string.

Figure 10:
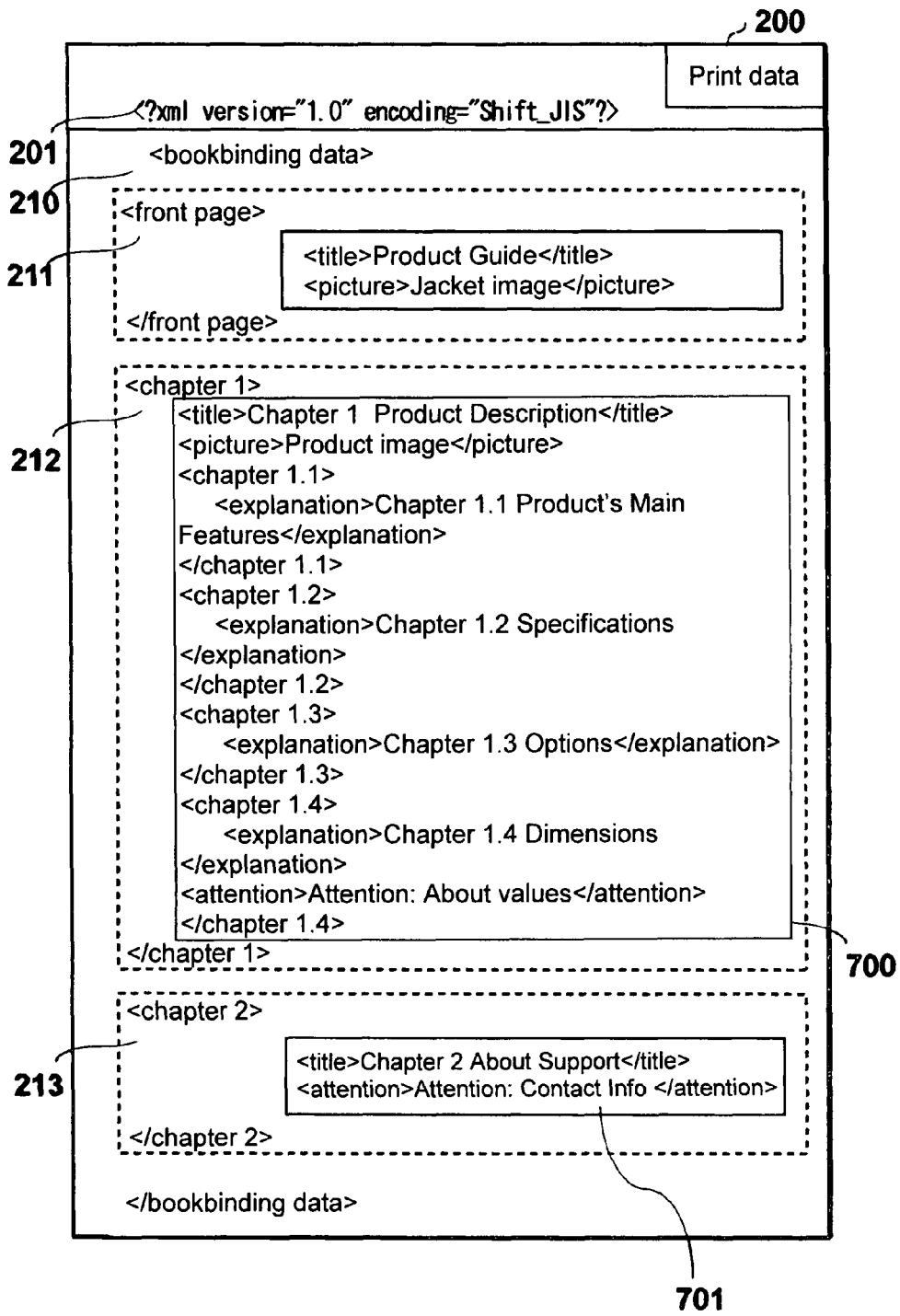
FIG. 10 is a schematic view showing an example of an XML document according to the second embodiment of the present invention.

FIG. 10 is a schematic view showing an example of an XML document according to the second embodiment of the present invention. As compared with the XML document shown in FIG. 2, <attention>~</attention> 700 is added to <chapter 1.4>~</chapter 1.4>, and <attention>~</attention> 701 is added to <chapter 2>~</chapter 2> 213. Other components are same as those in the XML document shown in FIG. 2, and explanation thereof are omitted.

Figure 11:
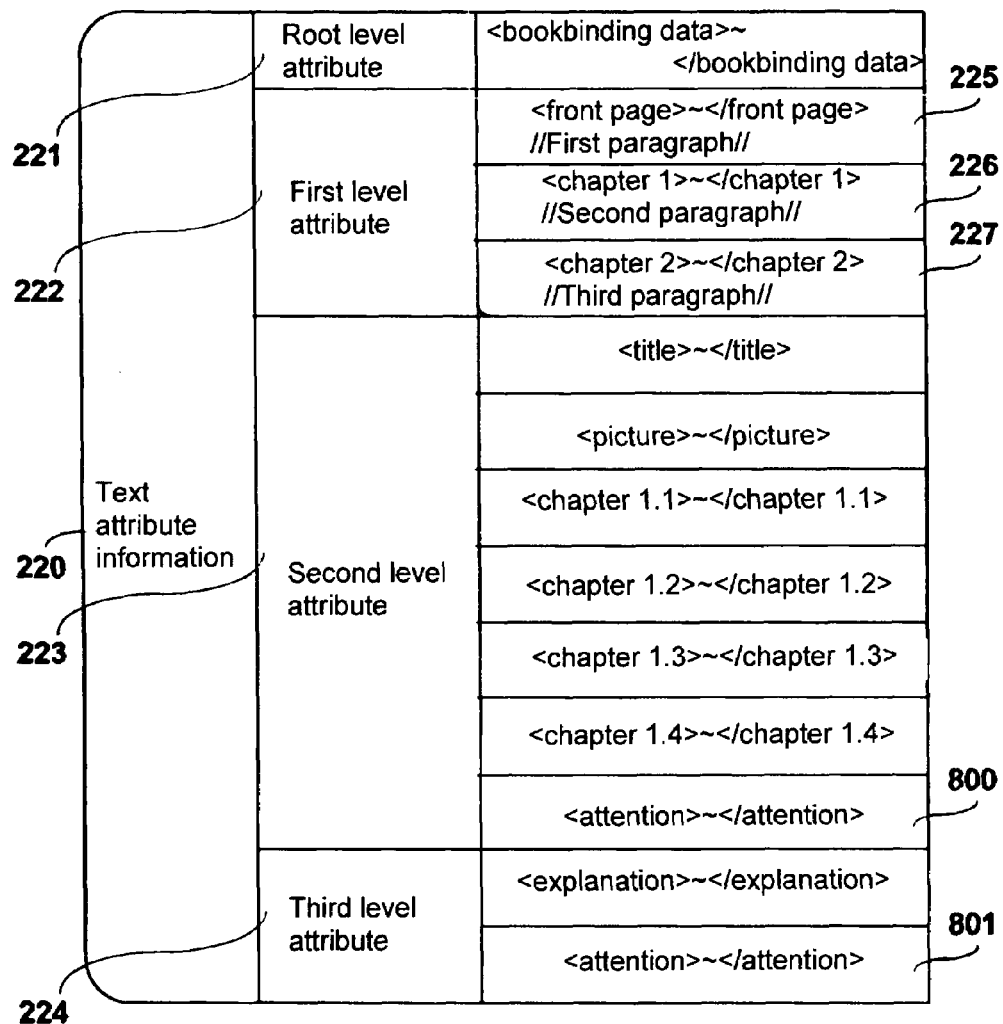
FIG. 11 is a schematic view showing text attribute information according to the second embodiment of the present invention.

FIG. 11 is a schematic view showing the text attribute information according to the second embodiment of the present invention. As compared with the XML document shown in FIG. 3, <attention>~</attention> 800 is added to the second level attribute 223, and <attention>~</attention> 801 is added to the third level attribute 224. Other components are same as those in the XML document shown in FIG. 3, and explanation thereof are omitted.

Figure 12:
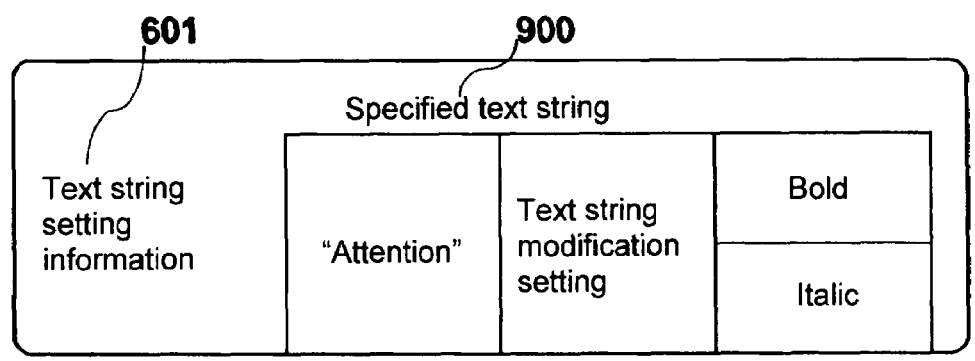
FIG. 12 is a schematic view showing setting information according to the second embodiment of the present invention.

FIG. 12 is a schematic view showing setting information according to the second embodiment of the present invention. As shown in FIG. 12, a user can freely specify the specified text string 900, and the specified text string 900 is stored in text string setting information 601. In the embodiment, "attention" is specified as the specified text string 900 as an example.

In the embodiment, a text string modification setting is stored for performing the image processing on the text data of the tag having the tag text string of "attention". For example, as the tag has the tag text string of "attention", it is set such that the text data of the tag are printed in bold and italic.

Figure 13:
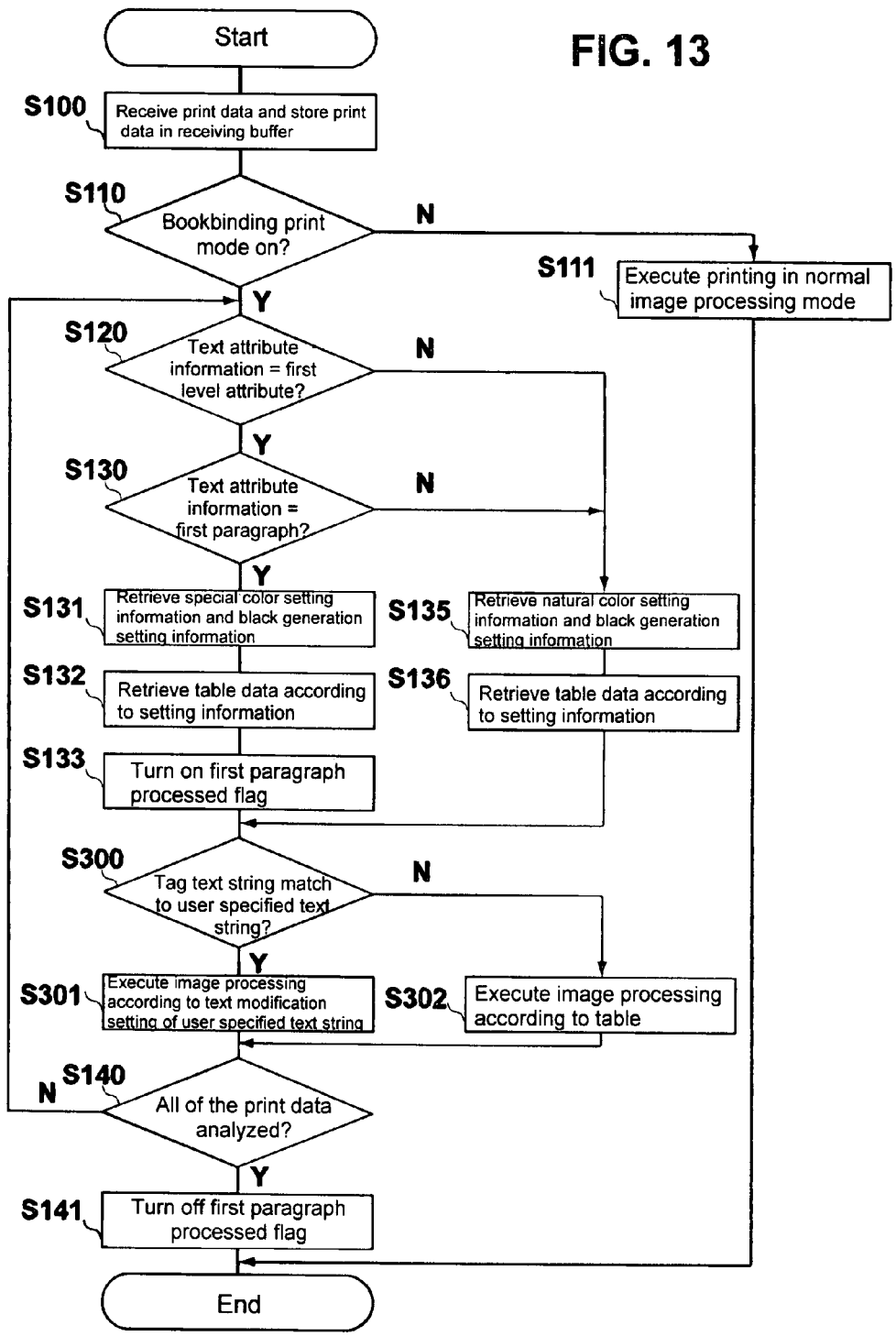
FIG. 13 is a flow chart showing an operation of the printer device according to the second embodiment of the present invention.

An operation of the printer device 2000 will be explained next. FIG. 13 is a flow chart showing the operation of the printer device 2000 according to the second embodiment of the present invention. As shown in FIG. 13, step S134 in the first embodiment is replaced with step S300 to step S302 in the second embodiment. Other steps in the second embodiment are the same as those in the first embodiment, and explanations thereof are omitted. In the following description, only step S300 to step S302 are explained.

In step S300, the CPU 120 executes the text string determination program 261, and determines whether the tag text string matches to the user specified text string 900. When it is determined that the tag text string matches to the user specified text string 900, the process proceeds to step S301. When it is determined that the tag text string does not match to the user specified text string 900, the process proceeds to step S302.

In step S301, the CPU 120 executes the print data analysis program 162, and performs the image processing on the text data of the tag having the user specified text string 900 as the tag text string according to the text string modification setting in the text string setting information 601.

In step S302, the CPU 120 executes the print data analysis program 162, and performs the image processing according to the table obtained in step S132 or step S136. Then, the process proceeds to step S140. The process after step S140 is the same as that in the first embodiment, and explanation thereof is omitted.

Figure 14:
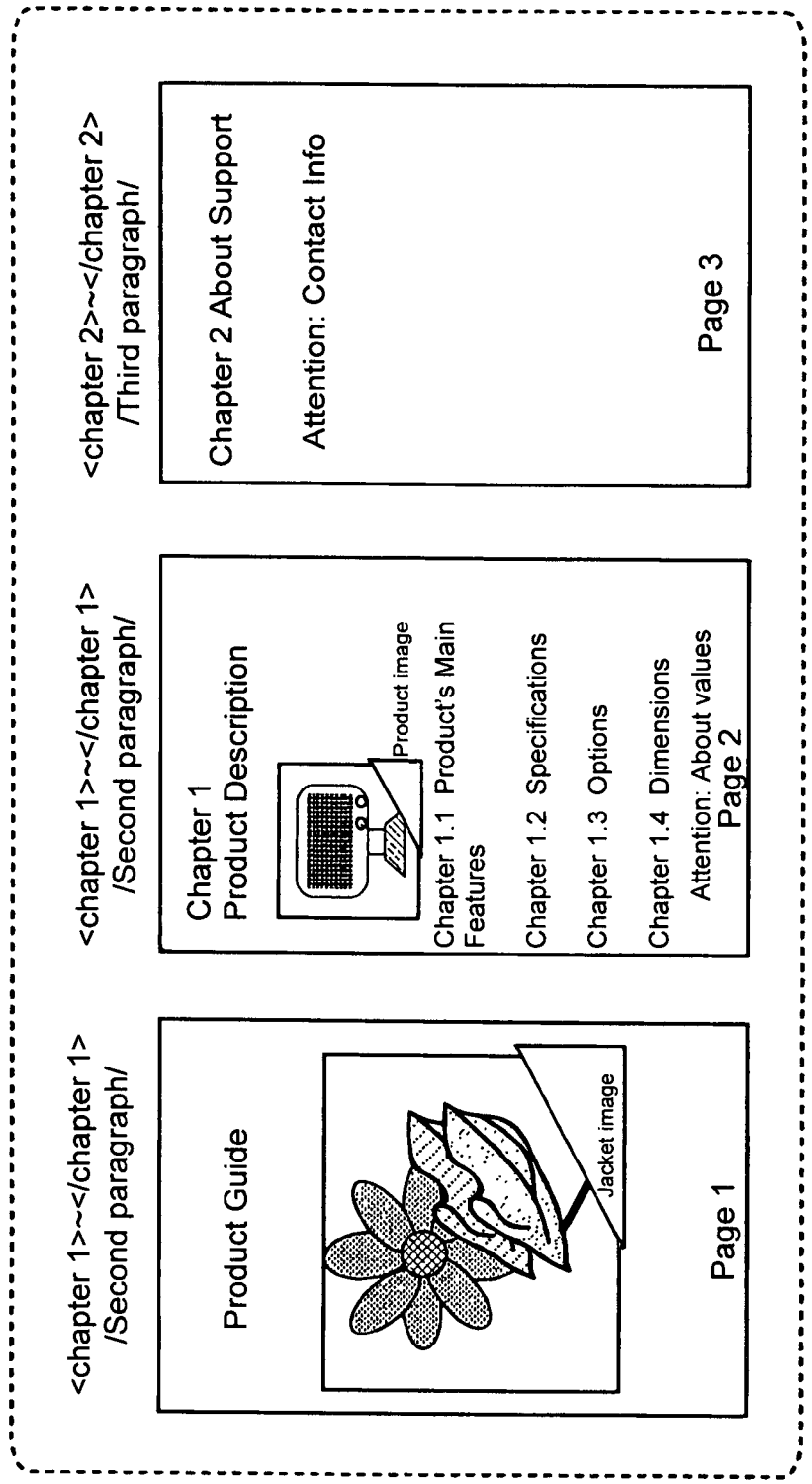
FIG. 14 is a view showing an example No. 2 of the output image of the conventional image processing apparatus.

FIG. 14 is a view showing an example No. 2 of the output image of the conventional image processing apparatus. As shown in FIG. 14, the front page is printed without the image processing specific to the front page, and without the text string modification on the text data of the tag thus specified.

Figure 15:
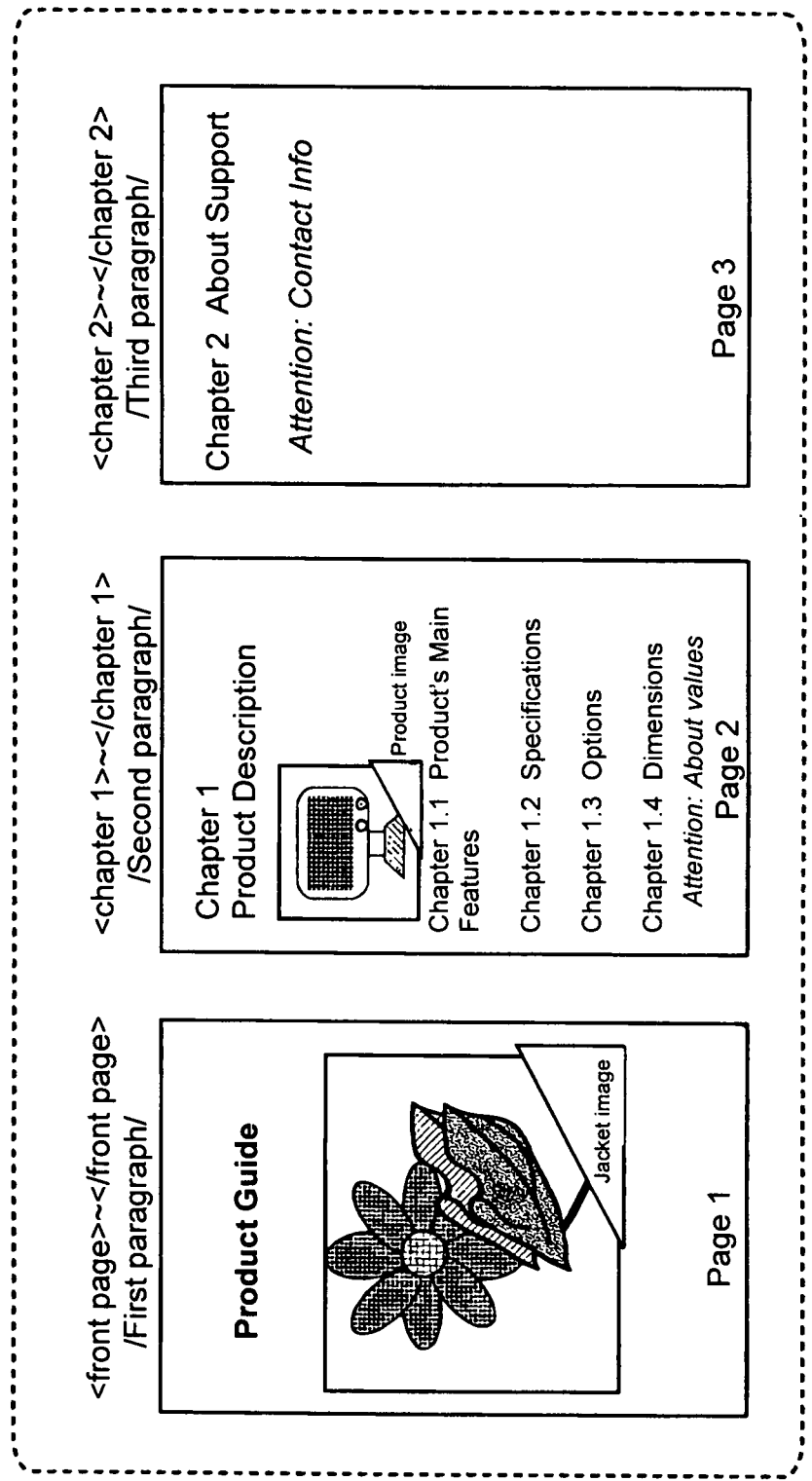
FIG. 15 is a view showing an example of an output image of the image processing apparatus according to the second embodiment of the present invention.

FIG. 15 is a view showing an example of an output image of the image processing apparatus according to the second embodiment of the present invention. As shown in FIG. 15, the front page is printed with the image processing specific to the front page, and with the text string modification on the text data of the tag thus specified. In the output images shown in FIG. 14 and FIG. 15, the first paragraph 225, the second paragraph 226, and the third paragraph 227 are printed on the first to third pages, respectively.

As compared with the output image without the image processing specific to the front page and without the text string modification on the text data of the tag thus specified shown in FIG. 14, in the output image with the image processing specific to the front page and with the text string modification on the text data of the tag thus specified shown in FIG. 15, the first paragraph 225 is printed vividly, and the text thereof becomes deep. Further, the tag text string, i.e., "attention", is printed in bold and italic, thereby obtaining the document drawing attention of the user.

As described above, in the second embodiment, it is determined whether the tag text string is the user specified text string. According to the result, the text data of the tag having the tag text string are modified. Accordingly, in addition to the effect in the first embodiment, it is possible to perform the image processing specific to the front page with the first paragraph and the text data of the tag having the user specified text string.

In the embodiment, the tag text string is printed in bold and italic, and may be printed in a different font or a different font size through enlarging processing or reduction processing.

Third Embodiment

Figure 16:
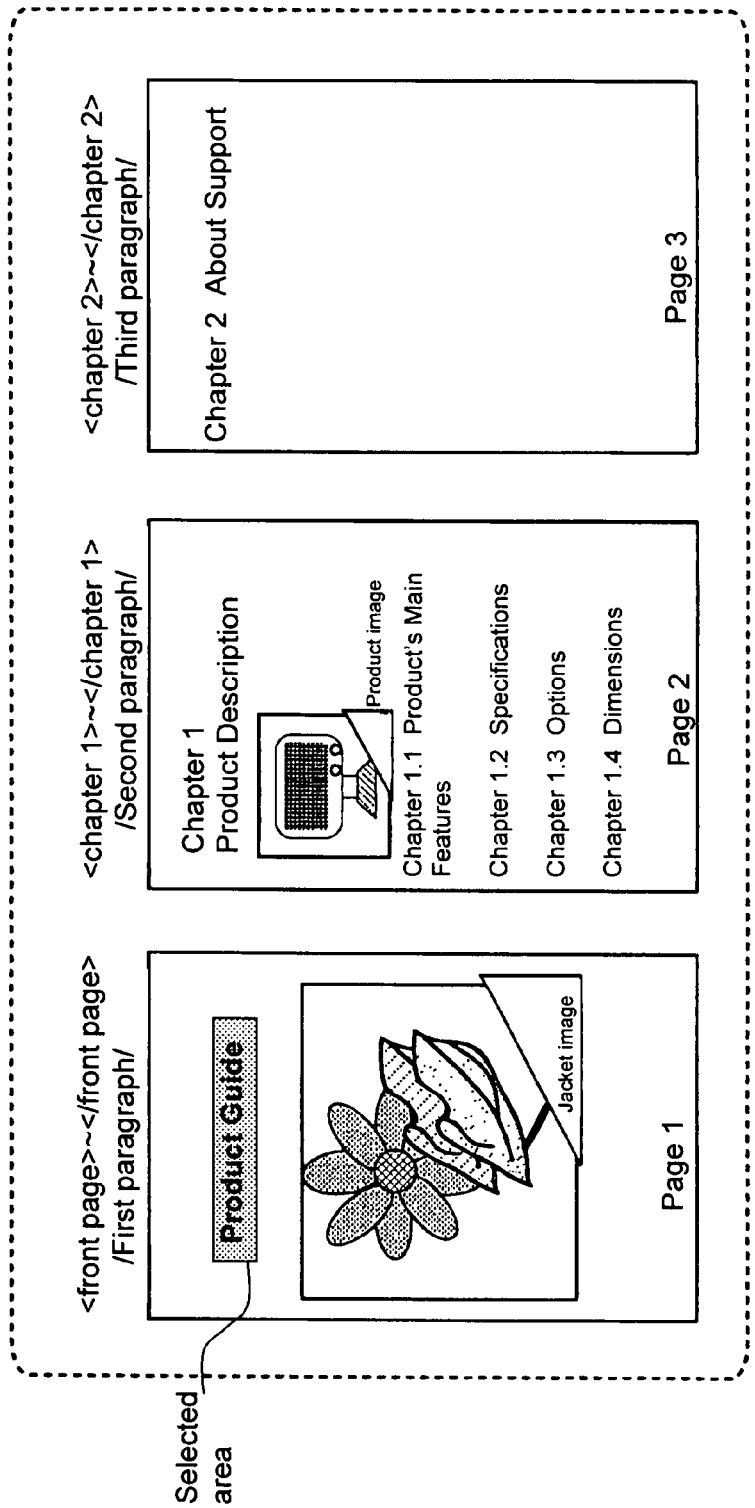
FIG. 16 is a view showing an example No. 1 of an output image of an image processing apparatus according to a third embodiment of the present invention.
Figure 17:
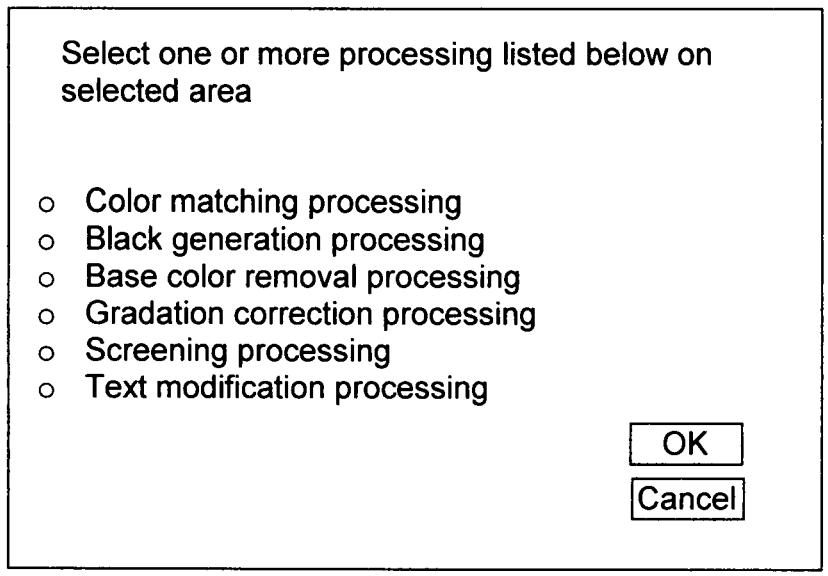
FIG. 17 is a view showing an example of a pop-up menu of the image processing apparatus according to the third embodiment of the present invention.
Figure 18:
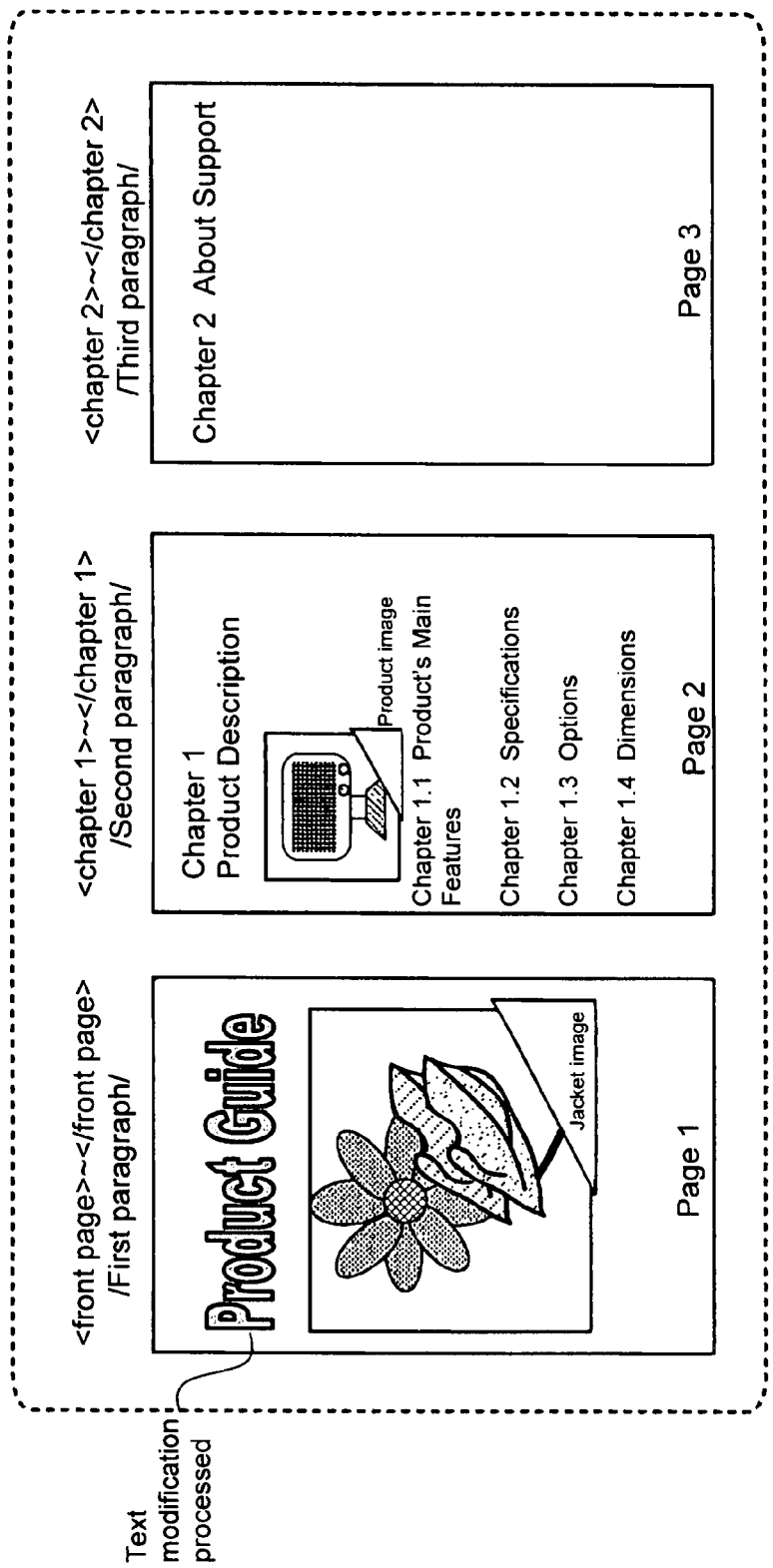
FIG. 18 is a view showing an example No. 2 of the output image of the image processing apparatus according to the third embodiment of the present invention.

A third embodiment of the present invention will be explained next. FIG. 16 is a view showing an example No. 1 of an output image of an image processing apparatus according to the third embodiment of the present invention. FIG. 17 is a view showing an example of a pop-up menu of the image processing apparatus according to the third embodiment of the present invention. FIG. 18 is a view showing an example No. 2 of the output image of the image processing apparatus according to the third embodiment of the present invention.

In the embodiment, it is arranged such that the user can review the image data to be printed with the host device on a pre-view screen. On the pre-view screen, the user selects an area where specific image processing is performed before printing. The specific image processing may include color matching processing, black generation processing, base color removal processing, gradation correction processing, screening processing, text modification processing, and the likes.

More specifically, the user uses a specific application to create a text with the host device. Before printing the text thus created, using a pre-view function of the host device, the user reviews the text thus created on the pre-view screen such as the example No. 1 of the output image shown in FIG. 7.

For example, when the user wants to perform specific image processing on the text "product guide", the user first selects "product guide" with a mouse. As a result, the pop-up menu shown in FIG. 17 appears. On the pop-up menu, the user selects the image processing to be performed on the area, i.e., "product guide", thus selected, and pushes an OK button. When the user selects not to perform the image processing, the user pushes a cancel button.

When the user selects, for example, the text modification processing on the pop-up menu screen shown in FIG. 17 and pushes the OK button, the output image shown in FIG. 18 appears. In the output image, the text modification processing is performed on the area of "product guide". When the user selects the printing, the image data is sent to the printer device as the image forming apparatus, so that the image with the text modification same as that shown in FIG. 18 is printed. In the embodiment, the user selects the text area, and may select an arbitrary area (image area).

The disclosure of Japanese Patent Application No. 2006-255998, filed on Sep. 21, 2006, is incorporated in the application by reference.

While the invention has been explained with reference to the specific embodiments of the invention, the explanation is illustrative and the invention is limited only by the appended claims.

What is claimed is:

1. An image processing apparatus for receiving print data of a plurality of pages including text attribute information and having a hierarchy structure according to a tag, and for performing specific image processings defined in advance on the print data, comprising:
    a memory;
    a central processing unit (CPU) detecting first data specific to a front page to be printed on one page and second data to be printed on other pages according to the tag included in the print data, said first data being defined as data between first specific tags for identifying the front page;
    an image processing unit performing a first one of the specific image processings on all objects in the first data, said first one of the specific image processings being different from a second one of the specific image processings to be performed on all objects in the second data; and
    a text attribute detection unit for detecting a specific text attribute according to the tag, said specific text attribute being set in the text attribute information and indicated by the tag, said image processing unit performing the specific image processings on the specific text attribute detected by the text attribute detection unit,
    wherein said CPU is configured to detect the first data defined as data between specific tags designated as <front page> and </front page>,
    said first one of the specific image processings is performed to generate a vivid color, and
    said second one of the specific image processings is performed to generate a natural color.

2. The image processing apparatus according to claim 1, wherein said CPU is configured to detect the first data including at least one of a paragraph and a text.

3. The image processing apparatus according to claim 1, wherein said image processing unit is configured to perform the specific image processings including at least one of color matching processing, black generation processing, base color removal processing, gradation correction processing, screening processing, and text modification processing.

4. The image processing apparatus according to claim 3, wherein said CPU is configured to detect the first data including a first level.

5. The image processing apparatus according to claim 1, wherein said image processing unit is configured to perform the specific image processings when the tag is recognized, and to perform a normal processing when the tag is not recognized.

6. The image processing apparatus according to claim 1, wherein said image processing unit is configured to perform the specific image processings on the printed data including an XML document.

7. The image processing apparatus according to claim 1, wherein said CPU is configured to detect the first data corresponding to an entire area of the one page.

8. The image processing apparatus according to claim 1, further comprising a storage unit for storing a first color processing table for providing the vivid color and a second color processing table for providing the natural color so that the image processing unit performs the first one to generate the vivid color according to the first color processing table and the second one to generate the natural color according to the second color processing table.

9. An image processing apparatus for receiving print data of a plurality of pages including text attribute information and having a hierarchy structure according to a tag, and for performing specific image processings defined in advance on the print data, comprising:
    a memory:
    a central processing unit (CPU) detecting first data specific to a front page to be printed on one page and second data to be printed on other pages according to the tag included in the print data, said first data being defined as data between first specific tags designated as <front path> and </front page>; and
    an image processing unit for, performing a first one of the specific image processings on all objects in the first data, said first one of the specific image processings being different from a second one of the specific image processings to be performed on all objects in the second data,
    wherein said first one of the specific image processings is performed to generate a CMYK (cyan, magenta, yellow, and black) mixed color as a black color, and
    said second one of the specific image processings is performed to generate a K (black) single color as the black color.

10. The image processing apparatus according to claim 9, further comprising a storage unit for storing a first color processing table for generating the CMYK mixed color as the black color and a second color processing table for generating the K single color as the black color so that the image processing unit performs the first one to generate the CMYK mixed color as the black color according to the first color processing table and the second one to generate the K single color as the black color according to the second color processing table.

* * * * *